US012667962B2

(12) United States Patent
Tseng et al.

(10) Patent No.: US 12,667,962 B2
(45) Date of Patent: Jun. 30, 2026

(54) AUTOMATED PROCESS ROBOTIC SYSTEM, METHOD, NON TRANSITORY COMPUTER READABLE RECORDING MEDIUM AND COMPUTER PROGRAM PRODUCT WITH INTEGRATED PROCESS AND AUTOMATED DATA ANALYSIS

(71) Applicant: BILINK CORP., New Taipei City (TW)

(72) Inventors: Yung-Chao Tseng, New Taipei City (TW); Ming Hsueh Yu, New Taipei City (TW)

(73) Assignee: BILINK CORP., New Taipei City (TW)

( * ) Notice: Subject to any disclaimer, the term of this patent is extended or adjusted under 35 U.S.C. 154(b) by 852 days.

(21) Appl. No.: 17/525,114

(22) Filed: Nov. 12, 2021

(65) Prior Publication Data

US 2022/0143825 A1     May 12, 2022

Related U.S. Application Data

(60) Provisional application No. 63/112,657, filed on Nov. 12, 2020.

(51) Int. Cl.
| | |
|---|---|
| *G06F 9/451* | (2018.01) |
| *B25J 9/16* | (2006.01) |
| *G06F 9/455* | (2018.01) |
| *G06F 9/48* | (2006.01) |

(52) U.S. Cl.
CPC .............. *B25J 9/163* (2013.01); *G06F 9/451* (2018.02); *G06F 9/45529* (2013.01); *G06F 9/4843* (2013.01)

(58) Field of Classification Search
CPC ..... G06F 9/451; G06F 9/45529; G06F 9/4843
See application file for complete search history.

(56) References Cited

U.S. PATENT DOCUMENTS

| | | | | |
|---|---|---|---|---|
| 10,656,955 | B1 * | 5/2020 | Nguyen | ............... G06F 40/154 |
| 11,016,789 | B2 * | 5/2021 | Cohen | .................... G06F 9/485 |
| 11,243,803 | B2 * | 2/2022 | Anand | ................. G06F 9/3838 |
| 11,789,754 | B2 * | 10/2023 | Grigore | .............. G06F 9/44526 |
| | | | | 717/171 |
| 12,014,193 | B2 * | 6/2024 | Bond | ........................ G06F 9/54 |
| 2020/0004798 | A1 * | 1/2020 | Weinert, Jr. | ........ G06F 16/9577 |

FOREIGN PATENT DOCUMENTS

CN          110333908 A     10/2019

* cited by examiner

*Primary Examiner* — Alvin H Tan
(74) *Attorney, Agent, or Firm* — MUNCY, GEISSLER, OLDS & LOWE, P.C.

(57) ABSTRACT
The present invention provides an automated process robotic system with integrated process and automated data analysis, comprising a customer-end equipment. The customer-end equipment loads at least one storage device to execute an automated process program, which provides a built-in browser. In addition, the customer-end equipment loads the storage device to execute the automated process program, and the automated process program loads a saved script program in order to execute a corresponding batch task via the built-in browser.

11 Claims, 11 Drawing Sheets

100

A customer-end equipment loads at least one storage device to execute an automated process program ⟋ S01

The customer-end equipment loads a saved script program via the automated process program and executes a corresponding batch task via the built-in browser ⟋ S02

The customer-end equipment is connected to a server equipment — S21

The customer-end equipment transmits a request signal to the server equipment according to the required script program — S22

The customer end equipment receives the script program requested from the server equipment — S23

AUTOMATED PROCESS ROBOTIC SYSTEM, METHOD, NON TRANSITORY COMPUTER READABLE RECORDING MEDIUM AND COMPUTER PROGRAM PRODUCT WITH INTEGRATED PROCESS AND AUTOMATED DATA ANALYSIS

CROSS REFERENCE TO RELATED APPLICATIONS

This application claims priority of U.S. Provisional Application No. 63/112,657 filed on 12 Nov. 2020 under 35 U.S.C. § 119(e), the entire contents of all of which are hereby incorporated by reference.

BACKGROUND OF THE INVENTION

1. Technical Field

The present invention is related to an automated process robotic system, method, non-transitory computer readable recording medium and computer program product, and in particular, to an automated process robotic system, method, non-transitory computer readable recording medium and computer program product with integrated process and automated analysis.

2. Description of Related Art

Robotic Process Automation (RPA) refers to an automated program simulating human using a computer to operate various types of software. In other words, it can be treated as a virtual robot for realizing the automated computer operation.

Since robotic process automation system operates at a relatively higher software level, the current system is not required to change or is subject to minimum extend of change of the currently existing software system, such that operation is performed on the system at the presentation level. Accordingly, in comparison to the traditional automated procedure, RPA software relatively requires no change of the software source code to cope with the automated process.

Despite that RPA software is able to effectively increase the efficiency of general administrative works, nonetheless, the design of RPA system interface will significantly affect the operation difficulty of users, and in particular, the automation process that depends on the computer software interface, such that any change or update of the application program or human interference is very likely to cause scrip program crash.

BRIEF SUMMARY OF THE INVENTION

In view of the aforementioned reasons, and based on the consideration that most of users are relatively familiar with the use of browsers an most of the modern working programs typically require interaction with network application program, the inventor designs the RPA interface into a browser format in order to allow users to built-in browser for development and execution of RPA script program while preventing third party application program change, update or human interference that may lead to the issue of script program crash.

An aspect of the present invention provides an automated process robotic system with integrated process and automated data analysis, comprising: a customer-end equipment loading at least one storage device to execute an automated process program; the automated process program providing a built-in browser; and wherein the customer-end equipment loads the storage device to execute the automated process program, and the automated process program loads a saved script program in order to execute a corresponding batch task via the built-in browser.

An another aspect of the present invention provides an automated process execution method with integrated process and automated data analysis, comprising: a customer-end equipment loading at least one storage device to execute an automated process program; and the customer-end equipment loading a saved script program via the automated process program and executing a corresponding batch task via the built-in browser.

An another aspect of the present invention provides a non-transitory computer readable recording medium, used for storing one or a plurality of computer programs comprising a plurality of commands, when a computer loads the non-transitory computer readable recording medium and executes the plurality of commands, the computer executes the automated process execution method with integrated process and automated data analysis.

An the other aspect of the present invention provides a computer program product, when a computer loads the computer program product, the computer executes the automated process execution method with integrated process and automated data analysis.

Thereby, the present invention compared to a known technology has the advantage effect of:
1. The present invention designs the system into the developer browser format, thereby providing a relatively more familiar interface to users for editing the script program.
2. The present invention is able to prevent third party application program update, change or human interference that may lead to the issue of script program crash.

DETAILED DESCRIPTION OF THE INVENTION

The technical contents of this disclosure will become apparent with the detailed description of embodiments accompanied with the illustration of related drawings as follows.

Figure 1:
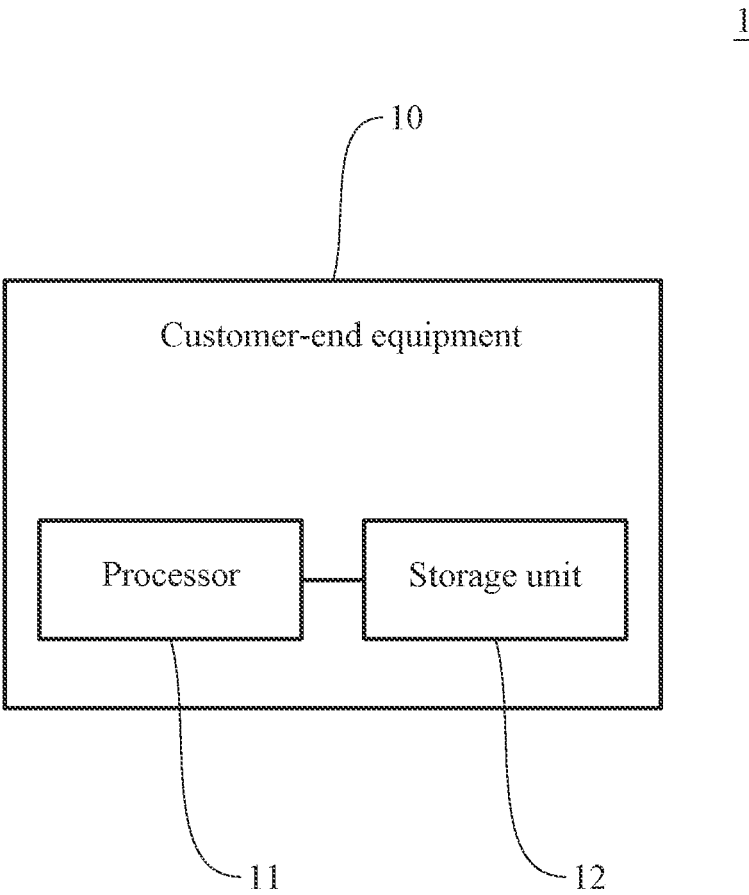
FIG. 1 is a block diagram showing a first embodiment of the automated process robotic system of the present invention.

The following provides description on one of embodiments of the present invention. First, please refer to FIG. 1, showing a block diagram of a first embodiment of the automated process robotic system of the present invention.

In this embodiment, an automated process robotic system 100 is disclosed, and the automated process robotic system 100 comprises a customer-end equipment 10. The customer-end equipment 10 mainly comprises a processor 11 and a storage unit 12 connected to the processor 11. In this embodiment, the processor 11 and the storage unit 12 are able to jointly form a computer or a processor, such as a personal computer, a workstation, a host machine computer, a smart device or other type of computer or device, and the present invention is not limited to any specified type of device.

The processor described in the present invention, for example, may be Central Processing Unit (CPU), or other programmable Microprocessor of general or special purpose, Application Specific Integrated Circuit (ASIC), Programmable Logic Device (PLD) or other similar device or a combination thereof, and the present invention is not limited to any specific type of processor.

The storage device described in the present invention may be, such as, volatile memory, non-volatile memory, internal memory, external memory or a combination thereof. The non-volatile memory may be, such as, non-volatile random access memory (NVRAM), flash memory, disk drive storage, resistive random access memory (ReRAM), phase-change random access memory (PRAM). The volatile memory may be, such as, static random access memory (SRAM).

In this embodiment, the processor 11 of the customer-end equipment 11 loads the storage device 12 of the customer-end equipment 10 to execute an automated process program, and the automated process program provides a built-in browser to generate or execute a script program. The automated process program is able to provide, including but not limited to, a script code program, a screen capture program, an optical character recognition (OCR), script editing tool, automated or cooperative execution program, and a neural network (such as, machine learning or deep learning), etc.

In an embodiment, during the script program training stage, the built-in browser provides an I/O tool interface corresponding to an application program in the development environment. In the application, the term "browser" for "built-in browser" refers to web browser. The I/O tool interface comprises the code snippet required for executing the application program. The code snippet may be, such as, but not limited to, software that supports Word, Excel, PPT, Outlook, Web API, SharePoint, PDF or other similar tool type of software. The built-in browser is provided in the development environment and execution environment of the script program for use. Since the built-in browser has a consistent standard in the development environment and execution environment, the risk of system crash and error can be reduced. In an embodiment, the I/O tool interface provided by the present invention in the development environment comprises two windows, wherein one window refers to a script editing window, and the other window refers to a browser operating window.

Figure 2:
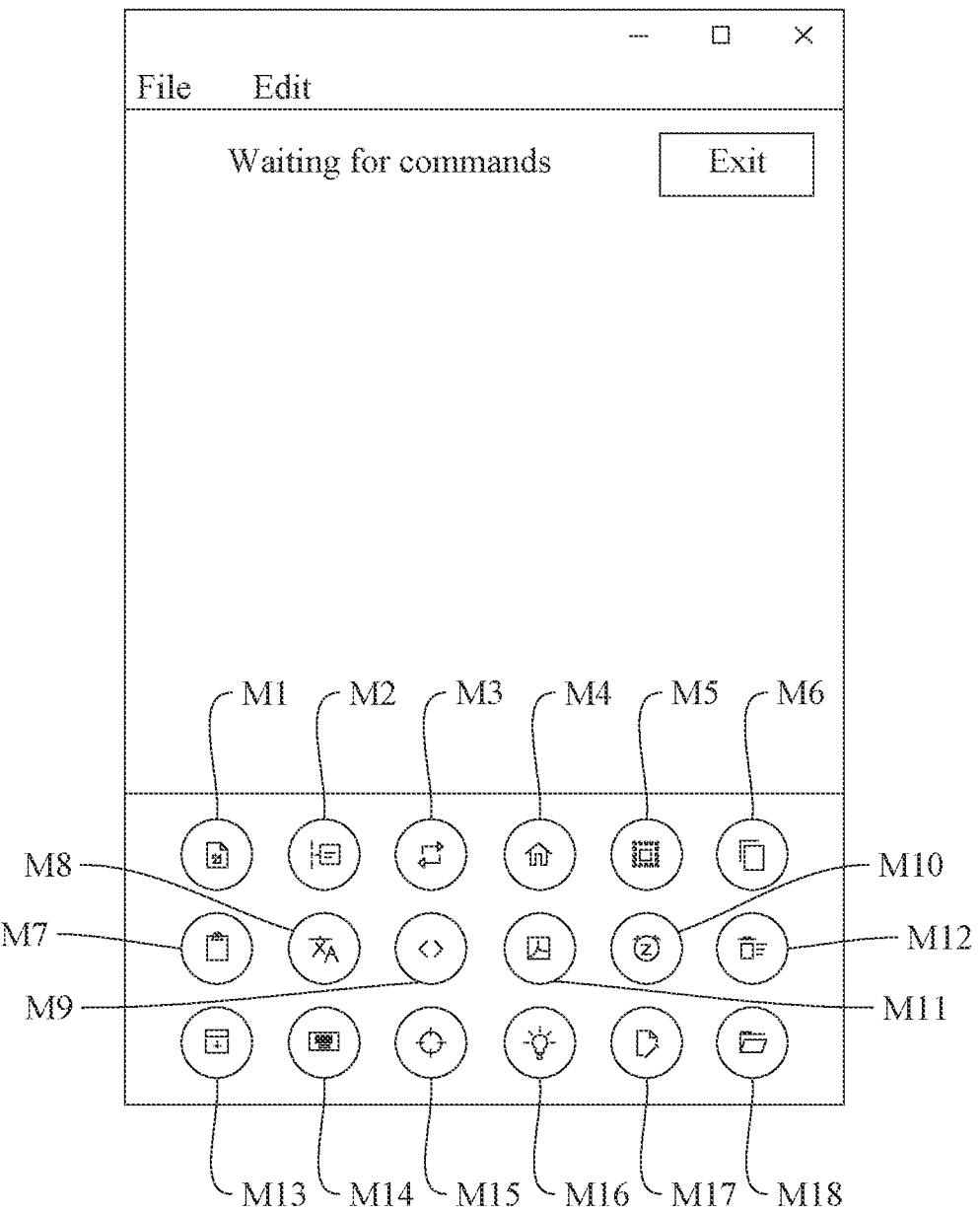
FIG. 2 is a schematic view of the operation interface of the script editing window of the present invention.

The script editing window is shown in FIG. 2. The scrip editing window provides webpage automated training tools for training script program, and the webpage automated training tool comprises, but not limited to, import file, insert sub-skill, work cycle, go to website, select all, copy, paste, insert text, run script, save as PDF, wait for a few seconds, delete step, capture information, send button, wait for node, guide user, revise file name, working folder.

The following provides further description on the function of each webpage automated training tool respectively:

Website input box WA: The website input box is used for inputting corresponding URL address in order to link to the corresponding server page.

Import file tool MI: The import file tool is used for selecting and importing assigned source file to the working folder, and the file name in the working folder can be assigned. In addition, the source file field can include function variable, such that during execution, the text file content of specified file name in the working folder can be replaced, in order to achieve the dynamic assignment effect.

Insert sub-skill tool M2: The insert sub-skill tool is used for selecting a skill and inserting into the process to become a step. When the script program executes to this batch task, all steps in this sub-skill are loaded and then executed sequentially.

Cycle work tool M3: The cycle work tool is used for selecting a text file (such as CSV format), and a cycle process is established according to each row data, and each field value is interpreted and then saved in the text file of the working folder.

Go to website tool M4: The go to website tool allows the browser operating window to move to the training mode home page.

Select all tool M5: The select all tool is used for selecting all text contents of the element where the cursor is located in the browser operating window.

Copy tool M6: The copy tool is used to copy the text selected in the browser operating window and save in the clipboard; in addition, it can also save file in the working folder.

Paste tool M7: The paste tool is used for pasting the text in the clipboard to the location of the cursor in the browser operating window.

Insert text tool M8: The insert text tool is used for selecting a text file, and then inserting the file text content at the location of the cursor in the browser operating window.

Run script tool M9: The run script tool is used for selecting webpage target node in the browser operating window, drafting script program for accessing, and it is typically used for the detailed operation webpage element or flexible capturing of webpage information.

Save as PDF tool M10: The save as PDF tool is used for saving the current page in the browser operating window as a PDF format file.

Wait for a few seconds tool M11: The wait for a few seconds tool is used to allow the automated process program assigned script program to wait for a specified number of seconds before continuing the execution.

Delete step tool M12: The delete step tool is used to delete the batch task assigned in the automated process program script program.

Capture content tool M13: The capture content tool is to use the mouse to select target node in the browser operating window and to capture the specified content type. The target node selected can be revised via the CSS selector in the script editing window.

Send button tool M14: The send button tool is used for sending specified button command to the browser operating window (button command, for example, can be but not limited to ENTER, BACKSPACE, ESCAPE, TAB, etc.), and the button command can also be inputted via the insert text tool or via keyboard input directly.

Wait for node tool M15: The wait for node tool is to use the mouse to select a target node in the browser operating window as a confirm step and to specify the number of seconds of delay. During execution, the automated process program will then wait for node selection to appear on the page in order to continue the process; otherwise, it will end the process under an error state. This tool is typically used in the operation of dynamic webpage.

Guide user tool M16: The guide user tool is to use mouse to select the target note in the browser operating window and to input hint texts. During the execution period, when the automated process program reaches this step, it is able to pause the automated execution and use a red tag to mark the node. In addition, the main window displays the hint texts to guide the user to operate the page manually. After completion, the "Complete" button is clicked in order to allow the script program to continue the automated executed.

Revise file name tool M17: It is used for revising the file name in the working folder. The source file field can include function variable, such that during execution, the text file content of specified file name in the working folder can be replaced, in order to achieve the dynamic assignment effect.

Working folder tool M18: The working folder tool is used for opening the working folder via the Windows Explorer or Mac Finder, and it is to check the temporary files currently being executed.

The aforementioned node, for example, may be but not limited to the object text, image, file, screenshot, text input box, etc. and the present invention is not limited to any specific type of object.

Figure 3:
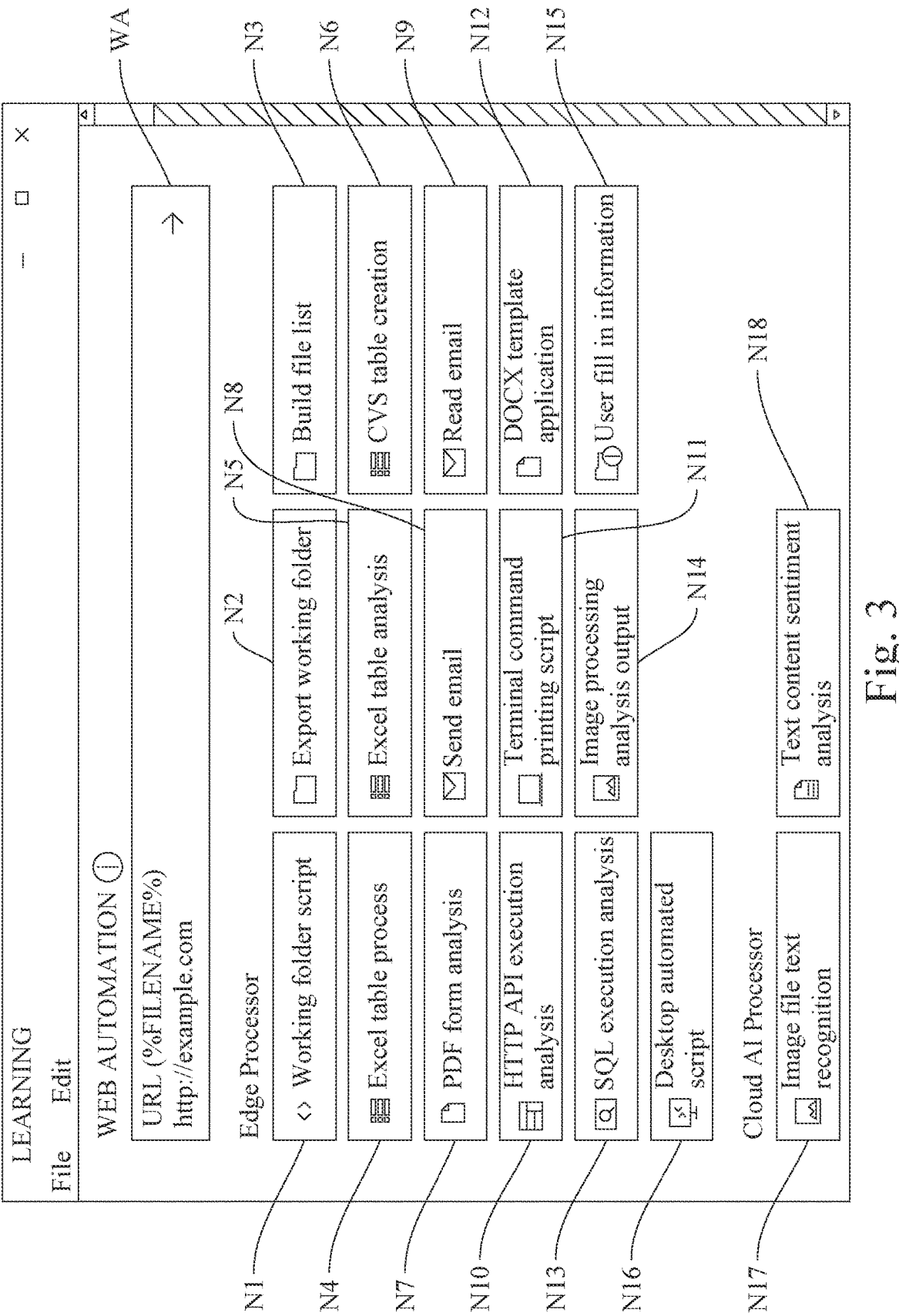
FIG. 3 is a schematic view of the operation interface of the browser operating window of the present invention.

The browser operating window is shown in FIG. 3. The browser operating window on the home page is to provide automated tool of specific purpose to the user for selection. The automated tool of specific purpose can be used to execute expansion I/O, such as, including but not limited to analysis or processing of EXCEL table data, interpretation of PDF file, access of email, operation of file and folder, HTTP request and response analysis, interpretation of text file, DOCX document template application, local machine command line execution, database SQL query and processing, etc., and the present invention is not limited to any specific type of processing. In an embodiment, after an automated tool of specific purpose is selected, the browser operating window is able to provide command-line or similar command-line interface to the user for operation, thereby allowing the operation of the user to be more flexible.

The following provides further description on the function of the automated tool of specific purpose respectively:

Working area script N1: The working area script is used to provide a command-line interface to the script program for execution, such as, but not limited to the following batch tasks: 1. Read the value stored by the text file in the working folder; 2. Write value to the text file in the working folder; 3. List all files in the working folder; 4. Read text file in the working folder; 5. Write text file in the working folder; 6. Change file name in the working folder; 7. Delete file in the working folder; 8. Call to execute a certain automated skill; 9. Divide a text file in the working folder (such as CSV format) into a number of smaller text files; 10. Save the written file as a file list; 11. Output any list data structure to a specific format file (such as CSV).

Document exporter N2: The document exporter is used to export file in the working folder and to provide the command-line interface to the script program for executing, such as, but not limited to the following batch tasks: 1. Print specified field of each entry of data inputted on the table; 2. Export all files or screened file in the working folder and add a fixed string at the front of each file name; 3. Export all files or screened file in the working folder and dynamically set the file name.

Document enumerator N3: The tool is provided to allow the user to select specified folder, and to provide the command-line interface to allow the script program to execute, such as, but not limited to the following batch tasks: 1. Print path of each file in the specified folder; 2. Create a table (such as CSV) for all or screened text files (such as TXT) in the specified folder.

EXCEL processor N4: The EXCEL processor is used for processing the EXCEL table input, followed by outputting into a text file (such as CSV) or EXCEL. The EXCEL processor provides the following shortcut function: 1. EXCEL input file is used for selecting or using corresponding EXCEL file; 2. SHEET option is used for selecting EXCEL input table name; 3. DATA CELL option is used for selecting the starting cell of the table data; 4. HEADER search is used for inputting the header field search array of the table; 5. OUTPUT option is used for selecting the output format (such as CSV or XLSX). The EXCEL processor also provides the command-line interface to allow the script program to execute, such as, but not limited to the following batch tasks: 1. Print specified field of each entry data inputted on the table; 2. Output table of specified criteria, and perform modification on the table.

EXCEL analyzer N5: The EXCEL analyzer is used to perform EXCEL table analysis. The EXCEL analyzer provides the following shortcut function: 1. EXCEL input file is used for selecting or using corresponding EXCEL file; 2. SHEET option is used for selecting EXCEL input table name; 3. DATA CELL option is used for selecting the starting cell of the table data; 4. HEADER search is used for inputting the header field search array of the table. The EXCEL analyzer also provides the command-line interface to allow the script program to execute, such as, but not limited to the following batch tasks: 1. Print specified field of each entry data inputted on the table; 2. Write the analysis result into the working folder.

CSV builder N6: The CSV builder is used for creating a CSV format file. The CSV builder allows the user to decide the outputted CSV file name. If a file of the same file name has existed in the working folder, the data row contained therein will be pre-loaded with the output array, in order to allow the script in the CSV file to continue to add new data row; or the script may actively delete the pre-loaded data row in order to allow the outputted table to restart again. The CSV builder also provides the command-line interface to allow the script program to execute, such as, but not limited to the following batch tasks: 1. Read value of text file in the working folder; 2. Add new data row, and the newly added data of the data row comes from the file in the working folder.

PDF analyzer N7: The PDF analyzer is used for executing the PDF content analysis. The PDF analyzer allows the user to select a specified PDF file, and also provides two modes of preview and training. In the preview mode, it is able to preview the document, and in the training mode, it provides the command-line interface to allow the user to perform coding. In an embodiment, the user interface of the PDF analyzer is able to provide the PDF password input option, in order to access PDF file with password protection. The PDF analyzer also provides the command-line interface to allow the script program to execute, such as, but not limited to the following batch tasks: Input the data object after PDF file conversion, including all text objects and line objects after unifying the coordinate system, and functions necessary for interpretation, and then outputting into one or a number of text files.

Mail sender N8: The mail sender is used for sending emails via SMTP. The mail sender provides the following fields to the user for input: 1. HOST field used for inputting SMTP mail server host name; 2. PORT field used for inputting SMTP mail server connection port; 3. TLS/SSL field for selecting whether the SMTP mail server requires TLS/SSL encryption; 4. USERNAME field used for inputting the account name set by the user in the mail server; 5. PASSWORD field used for inputting the account password set by the user in the mail server; 6. RECIPIENT field used for inputting the address of the recipient; 7. CC field used for inputting the address of the duplicate copy; 8. SUBJECT field used for inputting the mail title; 9. USE HTML field for selecting whether the mail content template uses HTML syntax; 10. MAIL TEMPLATE field used for inputting the mail content template, and the content template is able to support HTML syntax and text-only format; 11. ATTACH-MENT field used for adding specified attachment; 12. LOW-CODE field used for opening the command-line interface in order to confirm the content previously entered and to make revision before sending.

Mail reader N9: The mail reader is used for reading emails via IMAP. The mail reader provides the following fields to the user for input: 1. HOST field used for inputting IMAP mail server host name; 2. PORT field used for inputting IMAP mail server connection port; 3. TLS/SSL field for selecting whether the IMAP mail server requires TLS/SSL encryption; 4. USERNAME field used for inputting the account name set by the user in the mail server; 5. PASS-WORD field used for inputting the account password set by the user in the mail server; 6. MAILBOX field used for inputting the mailbox name; 7. SINCE DAY(S) AGO field used for setting the reading of mails of a number of days ago; 8. UNREAD ONLY field is used for setting whether unread mails are to be read only. The mail reader also provides the command-line interface to allow the script program for executing, such as, but not limited to the following batch tasks: 1. Print the subject and sender of each mail read; 2. Output the text field of the mail read to a text file (such as CSV), and save the file as an attachment.

HTTP analyzer N10: The HTTP analyzer is used for sending HTTP request and analyzing response. The HTTP analyzer provides the following fields to the user for input: 1. METHOD field used for selecting the request methods for sending HTTP request, and said HTTP request includes GET (request for display of specified resource), POST (physical body submitting the specified source), PUT (replace all presentation of request payment of the specified resource), DELETE (delete specified resource), HEAD (request for response identical to the GET method); 2. ENDPOINT field used for receiving the HTTP requested endpoint website; 3. HEADERS field for requested the header field object via HTTP; 4. TEXT/FILE/FORM option field for selecting the request content format. The HTTP analyzer also provides the command-line interface to allow the script program to execute, such as, but not limited to the following batch tasks: 1. Input HTTP response content; 2. Output the content in the response to the working folder.

Terminal command-line tool N11: The terminal command-line tool is used for providing the command-line interface to execute the local machine command-line commands. The command-line interface provided here is identical to the terminal or command-line mode of the local machine, and the execution result is outputted to a text file.

DOCX sample application tool N12: The DOCX sample application tool is used to use the DOCX file template to generate DOCX file of dynamic content. DOCX sample application tool provides the command-line interface to the script program for executing, such as, but not limited to the following batch tasks: 1. Read the value of text data in the working folder; 2. Define the variable corresponding to the DOCX template file content in the DOCX template file.

SQL execute analysis N13: The SQL execute analysis is used for connecting to the specified database in order to execute SQL command and to analyze and process the execution result. The SQL execute analysis provides the following fields to the user for input: 1. TYPE field: used for selecting the database type, such as mysql, postgres, oracle, etc.; 2. HOST filed: used for inputting the database host, such as IP address or host domain name; 3. PORT field: used for inputting the database host port number; 4. USER field: used for inputting the user account name for connecting to the database; 5. PASSWORD field used for inputting the user account password for connecting to the database; 6. DATABASE field used for inputting the database name; 7. SQL STATEMENT field: used for inputting the SQL command to be executed on the specified database. The SQL execute analysis provides the command-line interface to allow the script program to execute, such as, but not limited to the following batch tasks: 1. Input each data entry found in SQL into an input array; 2. Write the analysis result into the working folder and output as a text file.

Image processing analysis output N14: The image processing analysis output is used for performing image processing on the image inputted, followed by outputting into a file of specific format (such as PNG, JPG). The image processing, such as, may include but not limited to image enhancement, denoise, contrast enhancement, edge enhancement, feature capturing, image compression, and image conversion, etc. In another embodiment, the image processing analysis output may also input an image to a neural network, and output the result as a text file, or an image, and the present invention is not limited to any specific processing.

User input tool N15: The user input tool is to use the automated skill to allow the user to input text content or file path as the reference input for automated skill. The user input tool provides the following fields for the user's selection: 1. ADD option: the ADD option is used for adding a user input item, and it is divided into two types of options of Text and File. After the addition is made, it allows the user to provide description on such requested item (such as text description and file description). During the batch task execution stage, when the user completes the input, content generated according to the item requirement in the working folder is a text file of the inputted information; 2. RESET option: used for clearing all user input items; 3. TEST option: used for writing all the items inputted by the user into the working folder.

Desktop operation automated tool N16: The desktop operation automated tool uses the computer vision as the basic method to perform positioning and operation on the desktop system. In the training mode, the desktop operation automated module is able to use the remote training mechanism to prevent the user interface conflict on the automated target system. To be more specific, the remote training mechanism uses another computer under the same local area network in order to use the browser operating window to perform automated design on desktop of the target computer. The script program after the training is complete can be independently executed on the target computer directly. The desktop operation automated tool N16 provides the following fields to the user for selection: Trainer URL field: used for inputting the connection address of the controlled computer; DEBUG option: used for activating the debugger; TEST option: used for testing the current code; SAVE option: used for competing and saving the current automated design; command-line interface: the automated code drafted at the controlled end is synchronized to this area during testing or submission.

Image file text recognition tool N17: The image file text recognition tool allows the user to update image file onto the cloud server, and the cloud server is able to perform optical character recognition (OCR) on the image file uploaded in order to output a text file for sending to the customer-end equipment.

Text sentiment analysis tool N18: The text sentiment analysis tool allows the user to update text file onto the cloud server, and the cloud server is able to perform analysis on the uploaded image file via the neural network (such as machine learning, deep learning model), followed by outputting the sentiment analysis result in a text file for sending to the customer-end equipment.

The aforementioned command-line interface is able to use the input variable to dynamically change the inputted text file, in order to further change the input criteria, thereby achieving the effect of dynamic assignment.

In an embodiment, the present invention utilizes the built-in browser to access webpage, and it is able to obtain the webpage basic information via the markup language (such as HTML, CSS) and/or program language (such as Javascript) used by the accessed webpage, and during the training of script program, the webpage basic information and commands necessary for the batch task are saved in the script, thereby preventing the drawback that when traditional RPA is executing task on a standard browser, it is necessary to further establish corresponding batch task based on the redundant task executed by the I/O interface of standard browser. The webpage basic information may be, such as, hyperlink, download hyperlink, description language of drop-down menu, description language of text input box, etc. on the webpage, and the present invention is not limited to such types only.

Figure 4:
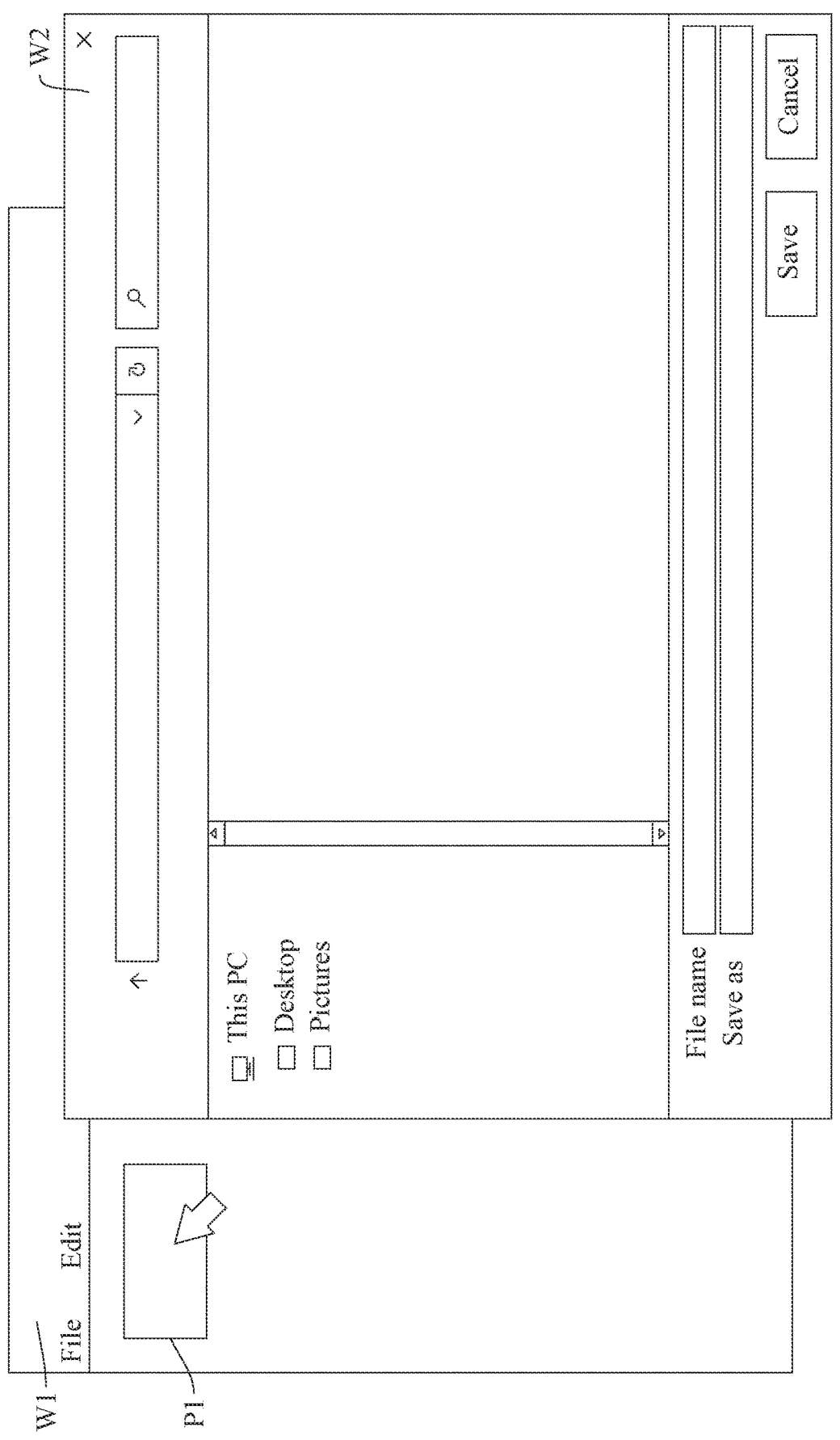
FIG. 4 is a schematic view of the operation interface of the filing window of the present invention.

In an embodiment, as shown in FIG. 4, during the training of the script program, when the built-in browser W1 accesses the webpage as the download hyperlink P1 is clicked with the cursor, the automated process program displays a saving window W2, and the user can select the saving path according to the pop-up saving window, and the saving path and the download hyperlink are then saved in the script program. When the script program training is complete and starts to execute the batch task, the automated process program is able to execute the download program based on the saving path and the download hyperlink directly, and there is no need for the pop-up saving window to allow the robot to execute the batch task corresponding to the saving window.

In an embodiment, the automated process program of the present invention is able to prevent conflicts between the computer user and the browser since the built-in browser includes an independent management saving space for saving Cache, Cookies, Local/Session Storage, or IndexedDB, etc. In another embodiment, the present invention is able to utilize the independent management saving space set up in the built-in browser to save different account information respectively and to save independent automated processes according to different accounts. Furthermore, in still another embodiment, the built-in browser of the present invention is able to save the operating environment information (such as the built-in browser checks the layout of webpage, scale, specific personalized layout during use of specific software, etc.) of each account. The automated process program of the present invention is able to preserve individual layout demands corresponding to different accounts in order to preserve the operating environment information, such that the information is independently saved corresponding to the account. During the execution of the script program via different account, it is able to call the operating environment information in the account in order to restore the execution environment of the built-in browser.

In an embodiment, the automated process program of the present invention includes the code snippet equipped with the function of providing network socket. The automated process program is able to utilize the expansion I/O of the built-in browser to connect to any server equipped with the network communication capability (such as UDP, TCP protocol) via the internet, and there is no need to operate any mail customer-end software (such as Microsoft Outlook, Microsoft Mail, Outlook Express, etc.) in order to execute operation in the built-in browser.

In an embodiment, the automated process program of the present invention provides a code snippet for connecting to the Application Programming Interface (API) of the operating system. The automated process program utilizes the expansion I/O of the built-in browser to directly call the code (such as function, constant, variable and data structure) of the API directly and to execute the script program.

Figure 5:
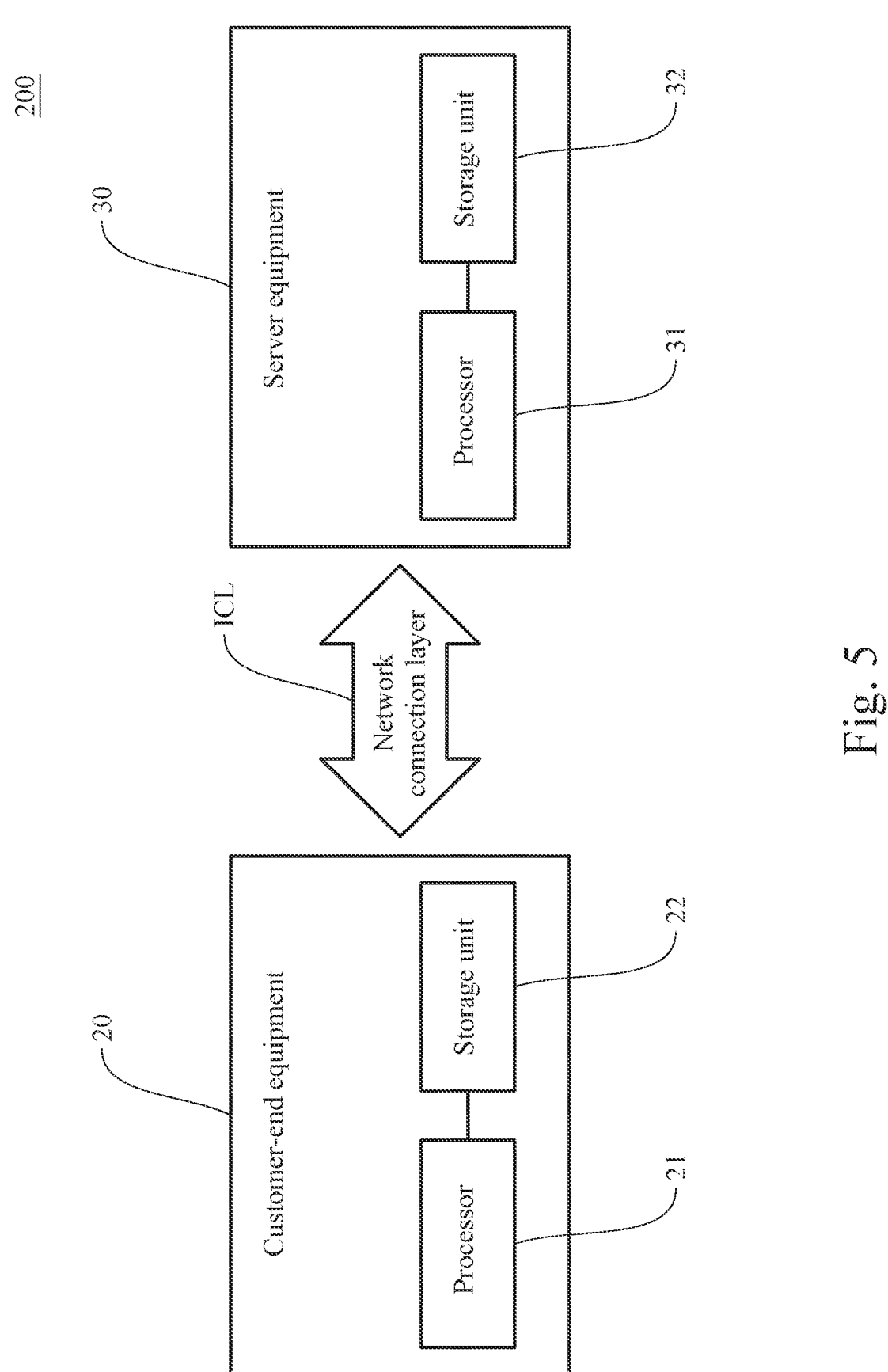
FIG. 5 is a block diagram showing a second embodiment of the automated process robotic system of the present invention.

The following provides description on another embodiments of the present invention. First, please refer to FIG. 5, showing a block diagram of a second embodiment of the automated process robotic system of the present invention.

In this embodiment, an automated process robotic system 200 is disclosed, and the automated process robotic system 200 comprises a customer-end equipment 20 and a server equipment 30. The customer-end equipment 20 and the server equipment 30 are connected to each other via the network connection layer ICL. To be more specific, the network connection layer ICL can be an interconnect network (or known as "Internet") or local area network, etc., such that through wired or wireless transmission method, the customer-end equipment 20 and server equipment 30 are able to access data from or to each other.

The customer-end equipment 20 mainly comprises a processor 21 and a storage unit 22 connected to the processor 21. In this embodiment, the processor 21 and the storage unit 22 are able to jointly construct a computer or a processor, such as a personal computer, a workstation, a host machine computer, a smart device or other type of computer or device, and the present invention is not limited to any specified type of device.

The server equipment 30 mainly comprises a processor 31 and a storage unit 32 connected to the processor 31. In this embodiment, the processor 31 and the storage unit 32 are able to jointly form a computer or a processor, such as a file server, a network attached storage, a database server or other types of computer or device, and the present invention is not limited to any specified type of device.

The processor described in the present invention, for example, may be Central Processing Unit (CPU), or other programmable Microprocessor of general or special purpose, Application Specific Integrated Circuits (ASIC), Programmable Logic Device (PLD) or other similar device or a combination thereof, and the present invention is not limited to any specific type of processor.

The storage device described in the present invention may be, such as, volatile memory, non-volatile memory, internal memory, external memory or a combination thereof. The non-volatile memory may be, such as, non-volatile random access memory (NVRAM), flash memory, disk drive storage, resistive random access memory (ReRAM), phase-change random access memory (PRAM). The volatile memory may be, such as, static random access memory (SRAM).

In this embodiment, the processor 21 of the customer-end equipment 20 loads the storage device 22 of the local-end equipment 20 to execute an automated process program, and the automated process program provides a built-in browser to generate or execute a script program. The automated process program is able to provide, including but not limited to, a script language program, a screen capture program, an optical character recognition (OCR), script editing tool, automated or cooperative execution program, and a neural network (such as, machine learning or deep learning), etc.

In this embodiment, the server equipment 30 is connected to the customer-end equipment 20, and the server equipment 30 is saved with a plurality of the script programs; the customer-end equipment 20 transmits a request signal to the server equipment 30; and the server equipment 30 transmits the corresponding script program to the customer-end equipment 20 after receiving the request signal.

The difference from the previous embodiment relies in that in this embodiment, the script program is saved in the database of the server equipment 30 in order to allow a plurality of customer-end equipment 20 to connect to the server equipment 30 for remote access; therefore, the script program updated by the server equipment 30 can be provided to the backend executing personnel for selection and execution via the plurality of customer-end equipment 20 connected thereto, such that the use convenience is increased.

In an embodiment, the server equipment 30 can perform classification of the script programs according to different functions in advance, following which an index can then be set up, and it can be saved in the database of the storage device 32 for backup. In this embodiment, the request signal transmitted by the customer-end equipment 20 may comprise the index corresponding to the necessary function, in order to allow the server equipment 30 to swiftly find the corresponding script program after receiving the request signal. During the transmission of the script programs and request signal, the key encryption method can be adopted to ensure the security of the data transmission.

Figure 6:
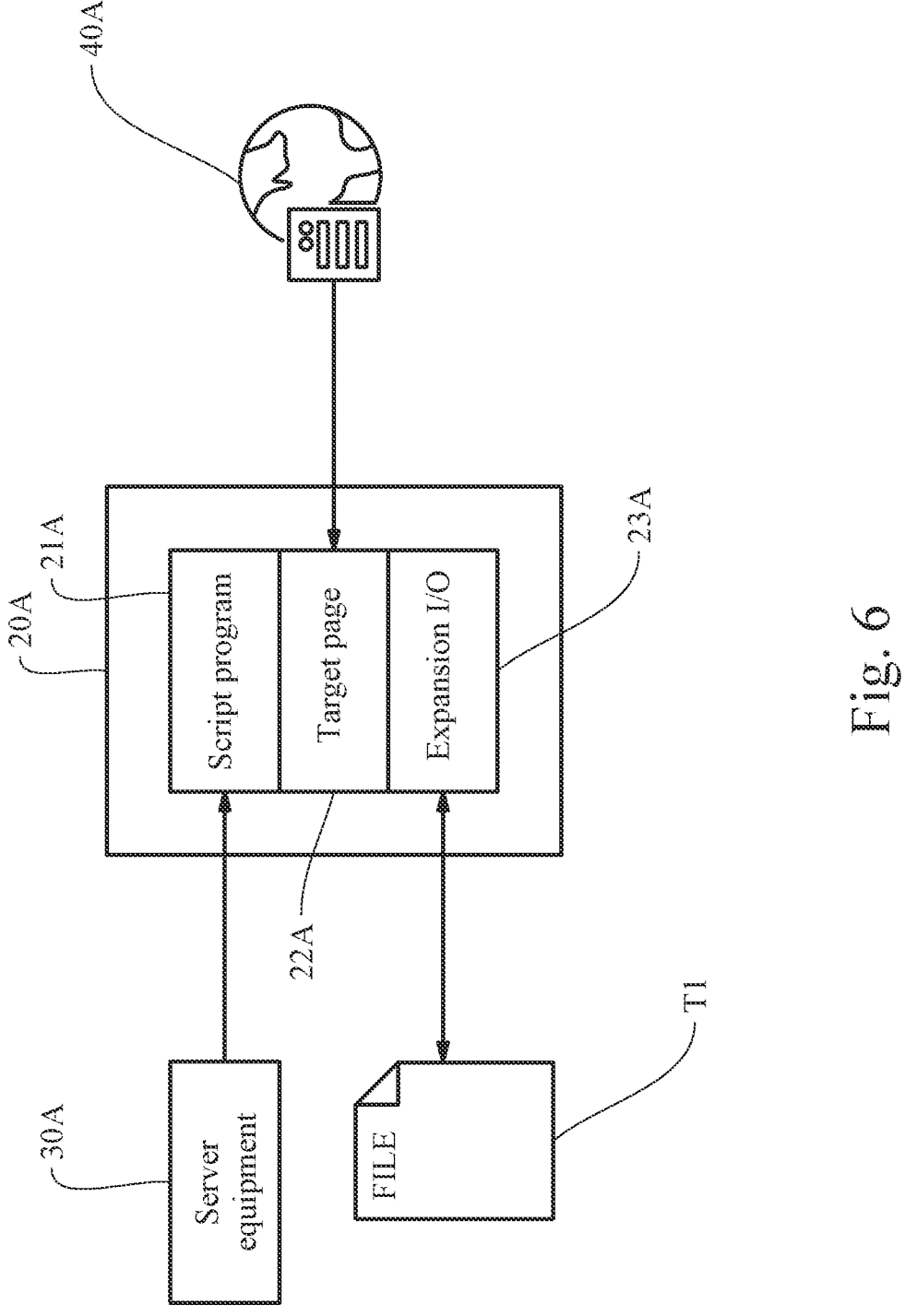
FIG. 6 is a working diagram of a first embodiment of the present invention.

Corresponding to different batch tasks, the following provides a plurality of different embodiments as illustrative examples to facilitate the understanding of the technical features of the present invention. Please refer to FIG. 6 first, showing a working diagram showing a first embodiment of the present invention.

In this embodiment, the customer-end equipment 20A downloads the required script program 21A via the server equipment 30A (in another embodiment, the customer-end equipment 20A may load the script program from its own database). After the customer-end equipment 20A loads the script program 21A, it is connected to the target server 40A via the built-in browser to access and download the target webpage 22A to the customer-end equipment 20A in order to execute the batch task. In addition, after the batch task is executed completely, an execution result is outputted via the expansion I/O 23A of the built-in browser. In this embodiment, the execution result may, such as, comprise input or output file. In another embodiment, the script program comprises outputting one or a plurality of text files T1 according to the execution result, and the present invention is not limited to such output only.

Figure 7:
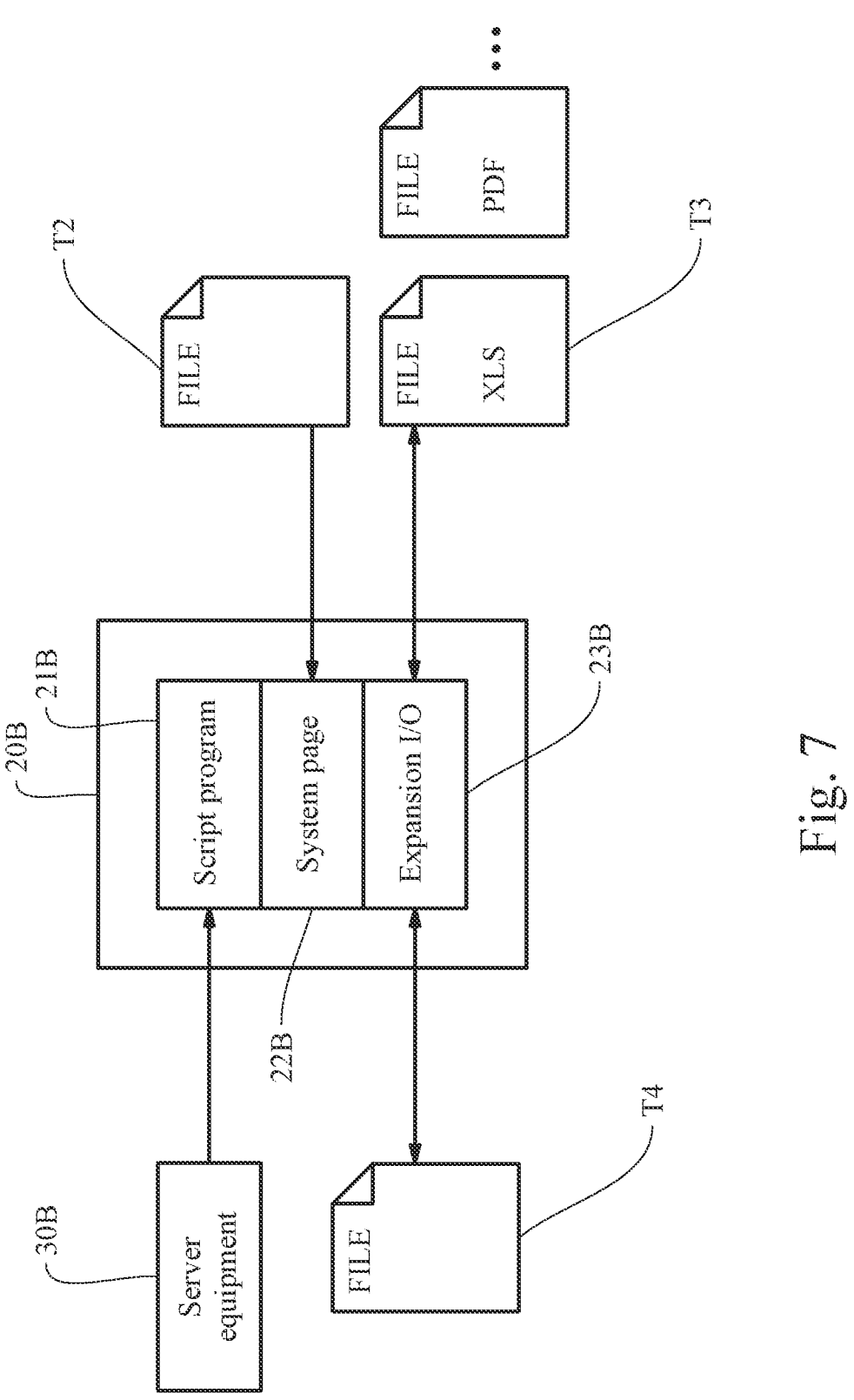
FIG. 7 is a working diagram of a second embodiment of the present invention.

In another embodiment, please refer to FIG. 7, showing a working diagram of a second embodiment of the present invention.

In this embodiment, the customer-end equipment 20B downloads the required script program 21B via the server equipment 30B (in another embodiment, the customer-end equipment 20B may load the script program from its own database). After the customer-end equipment 20B loads the script program 21B, it executes the batch task to load the target file T2 via the system page 22B of the built-in browser corresponding to the target file type, and outputs an execution result via the expansion I/O 23B of the built-in browser when the batch task is executed completely. In this embodiment, the automated process program of the customer-end equipment comprises the code snippet necessary for executing the file, and it does not require the installation of the application program for accessing the target file in the customer-end equipment. In this embodiment, the execution result may comprise, such as, outputting the selected format of file T3 (and it is not necessary to be identical to the format of the input file). In an embodiment, the execution result comprises revising the content of the target file. In another embodiment, the script program comprises outputting one or a plurality of text files T4 according to the execution result, and the present invention is not limited to such output only.

Figure 8:
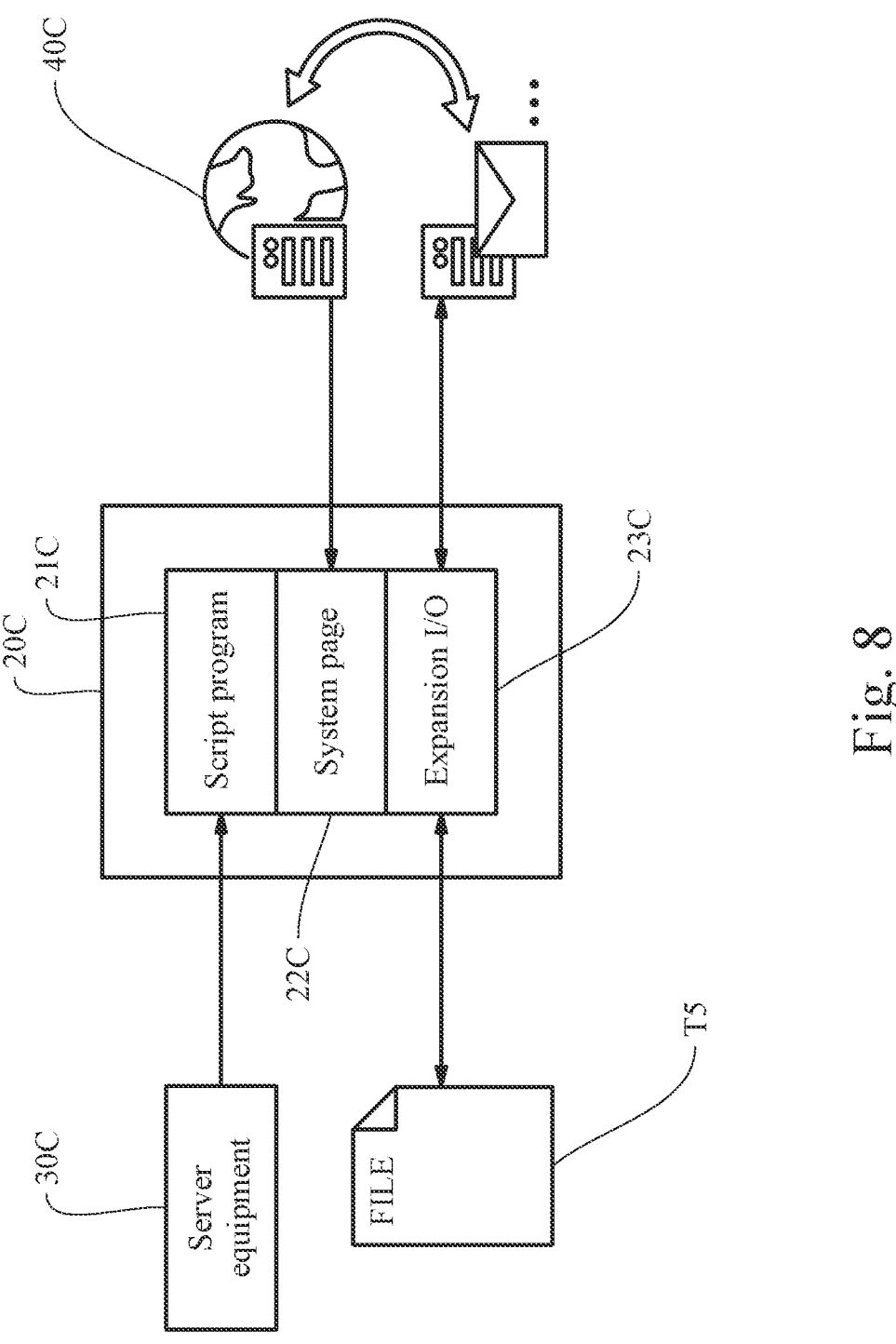
FIG. 8 is a working diagram of a third embodiment of the present invention.

In another embodiment, please refer to FIG. 8, showing a working diagram of a third embodiment of the present invention.

In this embodiment, the customer-end equipment 20C downloads the required script program 21C via the server equipment 30C (in another embodiment, the customer-end equipment 20C may load the script program from its own database). After the customer-end equipment 20C loads the script program, it is connected to the target server 40C via the system page 22C of the built-in browser corresponding to the target server 40C to execute the batch task in order to process the data of the target server 40C, and an execution result is outputted via the expansion I/O 23C of the built-in browser. The execution result comprises reading data from or writing data in the target server 40C, such as connecting to the target server in order to send and receive mails, etc. In an embodiment, the script program comprises outputting one or a plurality of text files T5 according to the execution result, and the present invention is not limited to such output only.

Figure 9:
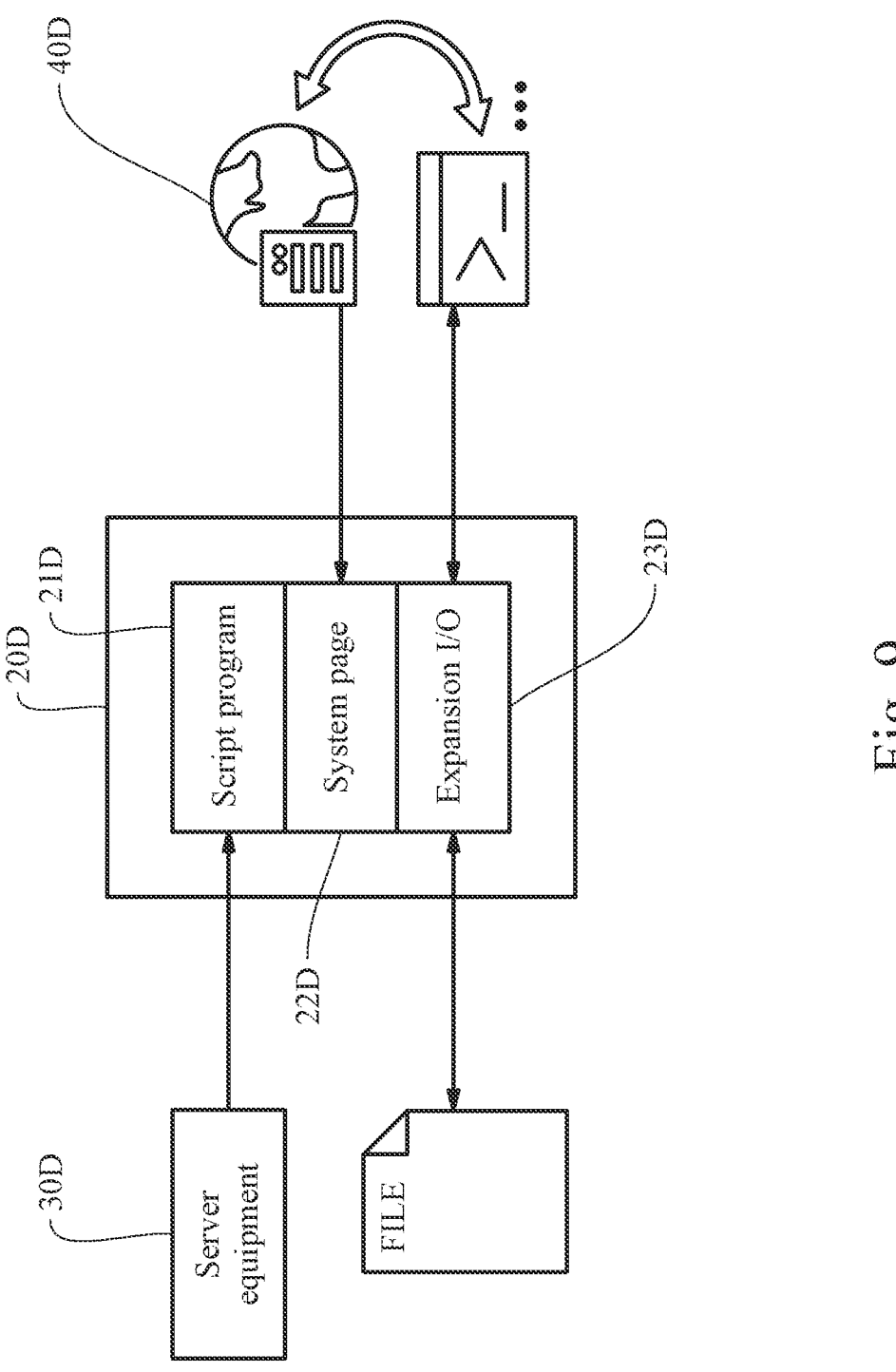
FIG. 9 is a working diagram of a fourth embodiment of the present invention.

In another embodiment, please refer to FIG. 9, showing a working diagram of a fourth embodiment of the present invention.

In this embodiment, the customer-end equipment 20D downloads the required script program 21D via the server equipment 30CD (in another embodiment, the customer-end equipment 20D may load the script program from its own database). After the customer-end equipment 20D loads the script program, it executes the batch task via the system page 22D of the built-in browser corresponding to the target terminal controller 40D, processes the data of the target terminal controller 40D via the built-in browser and outputs an execution result via the expansion I/O 23D. In an embodiment, the script program comprises outputting one or a plurality of text files according to the execution result, and the present invention is not limited to such output only.

The aforementioned outputted text file can be used as the input value for the next batch task or another script program. Through such method, each script program can be modularized, thereby reducing the number of trainings and reducing the difficulty of script program editing.

In an embodiment, the automated process program, according to the demand, is able to perform a plurality of aforementioned embodiments on one script program based on the sequence of the batch tasks; therefore, it can be understood that the present invention is not limited to the execution of one single embodiment in one script program. In an embodiment, after the download of the script program, it can be saved in a non-transitory memory, and the script program can be deleted after one single batch task is executed completely, or the scrip program can be saved in the database of the customer-end equipment for next time of execution, and the present invention is not limited to such configuration only. In another embodiment, the script program can be saved in a transitory memory, and the script program can be deleted after the batch task is executed completely, and the present invention is not limited to such configuration only.

Figure 10:
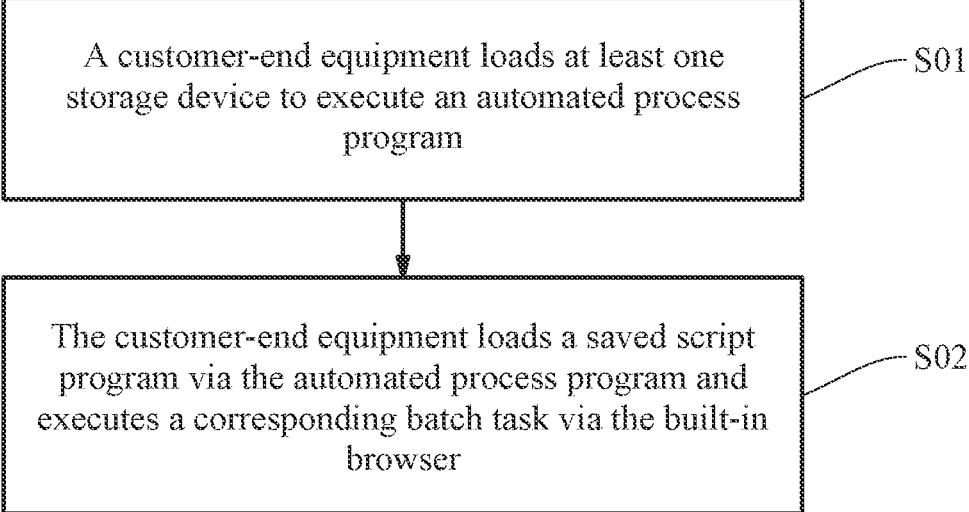
FIG. 10 is a flow chart of an embodiment of the automated process execution method of the present invention.

For one of the embodiments of the present invention, please refer to FIG. 10, showing a flow chart of an embodiment of the automated process execution method of the present invention.

This embodiment discloses an internet-based automated process execution method, comprising the following process.

A customer-end equipment loads at least one storage device to execute an automated process program (Step S01).

The customer-end equipment loads a saved script program via the automated process program and executes a corresponding batch task via the built-in browser (Step S02). In Step S02, the script program can be saved in the customer-end equipment in advance, or can be downloaded by the server equipment and then executed. The present invention is not limited to such configuration only.

Figure 11:
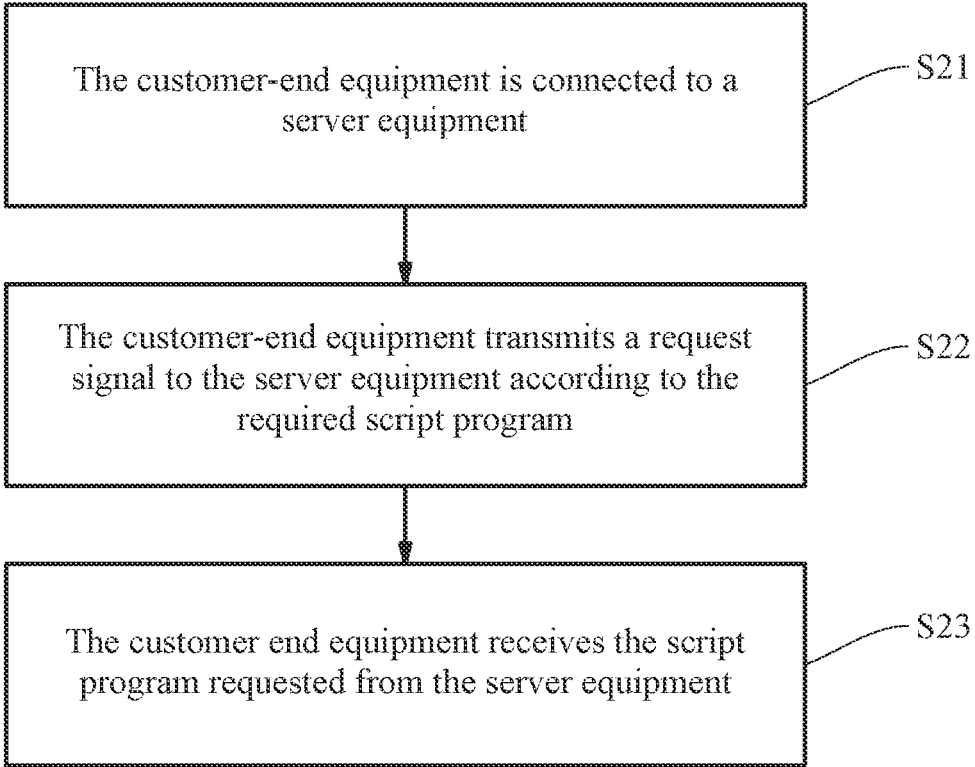
FIG. 11 is a flow chart of another embodiment of the automated process execution method of the present invention.

To be more specific, in an embodiment, as shown in FIG. 11, in Step S02, the customer-end equipment obtains the script program via the following method: First, the customer-end equipment is connected to a server equipment (Step S21); next, the customer-end equipment transmits a request signal to the server equipment according to the required script program (Step S22); finally, the customer end equipment receives the script program requested from the server equipment (Step S23).

The aforementioned method can be implemented via the method of a computer readable recording medium, and the computer readable recording medium, can be, such as, read only memory, flash memory, floppy disk, hard disk, optical disk, portable disk drive, magnetic tape, database accessed via network or any other storage medium having the same function that can be easily comprehended by a person skilled in the art in this field. After the computer loads the scan-path certification program and executes the program, it is able to complete the aforementioned method.

In addition to the computer readable recording medium, the aforementioned method steps can also be implemented as a computer program product that can be saved in a network server hard disk, memory device, such as app store, google play, windows store, or other similar application program online release platforms, such that the computer program product can be implemented via the method of uploading onto the server for users to perform paid downloads.

In view of the above, the present invention designs the system into the developer browser format, thereby providing a relatively more familiar interface to users for editing the script program. Besides, the present invention is able to prevent third party application program update, change or human interference that may lead to the issue of script program crash.

The above is the detailed description of the present invention. However, the above is merely the preferred embodiment of the present invention and cannot be the limitation to the implement scope of the invention, which means the variation and modification according to the present invention may still fall into the scope of the present invention.

What is claimed is:

1. An automated process execution method with integrated process and automated data analysis, comprising:
    a customer-end equipment loading at least one storage device to execute an automated process program; and
    the customer-end equipment loading a saved script program via the automated process program and executing a corresponding batch task via a built-in browser provided by the automated process program;
    wherein the built-in browser is an RPA interface built as a browser format for preventing third party application program from script program crash;
    wherein the built-in browser provides an I/O tool interface, the I/O tool interface comprises a code snippet for executing an application program without the installation of the application program in the customer-end equipment, and the automated process program utilizes an expansion I/O of the built-in browser to directly call the code snippet to execute the script program;
    wherein the script program is exclusively executed in the built-in browser;
    wherein the built-in browser provides a consistent standard that executes the script program independently of third-party application programs, thereby preventing the script program crash caused by updates or changes to the third-party applications.

2. The automated process execution method according to claim 1, wherein the customer-end equipment obtains the script program via the following method:
    connecting the customer-end equipment to a server equipment;
    the customer-end equipment transmitting a request signal to the server equipment based on the required script program; and
    the customer-end equipment receiving the requested script program from the server equipment.

3. The automated process execution method according to claim 1, wherein the built-in browser is provided for use in a development environment and an execution environment of the script program.

4. The automated process execution method according to claim 1, wherein the script program comprises connecting to a target webpage via the built-in browser to execute the corresponding batch task, and outputting an execution result.

5. The automated process execution method according to claim 4, wherein the script program comprises outputting a text file based on the execution result.

6. The automated process execution method according to claim 4, wherein the built-in browser provides an I/O tool interface corresponding to an application program; and the I/O tool interface comprises a code snippet required for executing the application program.

7. The automated process execution method according to claim 1, wherein the script program comprises executing the batch task via the built-in browser to access a target file, and outputting an execution result.

8. The automated process execution method according to claim 7, wherein the execution result comprises revising a content of the target file.

9. The automated process execution method according to claim 1, wherein the script program comprises connecting to a target server via the built-in browser to execute the batch task in order to process data of the target server, and outputting an execution result.

10. The automated process execution method according to claim 1, wherein the script program comprises executing the batch task via the built-in browser to process data of a target terminal controller, and outputting an execution result.

11. A non-transitory computer readable recording medium, used for storing one or a plurality of computer programs comprising a plurality of commands, when a computer loads the non-transitory computer readable recording medium and executes the plurality of commands, the computer executes the method according to claim 1.

\*  \*  \*  \*  \*